United States Patent [19]
Han et al.

[11] Patent Number: 5,914,868
[45] Date of Patent: *Jun. 22, 1999

[54] MULTIPLIER AND NEURAL NETWORK SYNAPSE USING CURRENT MIRROR HAVING LOW-POWER MOSFETS

[75] Inventors: Il Song Han; Young Jae Choi; Dae Hwan Kim, all of Seoul, Rep. of Korea

[73] Assignee: Korea Telecom, Seoul, Rep. of Korea

[ * ] Notice: This patent is subject to a terminal disclaimer.

[21] Appl. No.: 08/940,004

[22] Filed: Sep. 29, 1997

[30] Foreign Application Priority Data

Sep. 30, 1996 [KR] Rep. of Korea ...................... 96-43268

[51] Int. Cl.⁶ .............................. H02M 3/18; G05F 3/16; G06F 1/04
[52] U.S. Cl. ........................... 363/60; 323/313; 323/314; 323/315; 327/296
[58] Field of Search ............................... 363/60; 323/313, 323/314, 315, 316, 317; 327/296, 201, 510, 522, 529

[56] References Cited

U.S. PATENT DOCUMENTS

| | | | |
|---|---|---|---|
| 4,950,917 | 8/1990 | Holler et al. | 307/201 |
| 5,276,368 | 1/1994 | Kimura et al. | 307/522 |
| 5,583,425 | 12/1996 | Rapp et al. | 323/316 |

*Primary Examiner*—Edward H. Tso
*Assistant Examiner*—Rajnikant B. Patel
*Attorney, Agent, or Firm*—Staas & Halsey

[57] ABSTRACT

A multiplier and a neural network synapse capable of removing nonlinear current using current mirror circuits. The multiplier produces a linear current by using MOS transistors operating in a nonsaturation region. The multiplier includes a first current mirror including a plurality of MOS transistors to form a first current and a second current mirror including a plurality of MOS transistors to form a second current, wherein the second current mirror is coupled in parallel to the first current mirror. As a result, the multiplier outputs an output current by subtracting a second current from said first current.

15 Claims, 2 Drawing Sheets

MULTIPLIER AND NEURAL NETWORK SYNAPSE USING CURRENT MIRROR HAVING LOW-POWER MOSFETS

BACKGROUND OF THE INVENTION

1. Field of the Invention

The present invention relates to a multiplier and a neural network synapse using low-power MOSFETs, and more particularly to a multiplier capable of removing nonlinear current using current mirror circuits.

2. Description of the Related Art

Recently, with the development of the VLSI technology, it is required that a digital system be integrated with an analog system. The reason why the digital system is integrated with the analog system is because the digital technology is employed not only in a specific use, such as a computer system, but also in various scopes such as telecommunications and neural networks. This well-coordinated application has been required in a new field of user interface. The digital circuit or system reaches the critical point from its computational speed and integration. In implementing a multiplier, which is the foundation of a digital signal process, the conventional VLSI technology has many limitations in the chip area and its speed, due to its system complexity. On the other hand, it is very difficult to adopt current analog integration circuits in the VLSI technology.

SUMMARY OF THE INVENTION

It is an object of the present invention to provide a high-performance multiplier and a neural network synapse operating in a low voltage level, using the VLSI technology.

Another object of the present invention is to provide a high-performance multiplier capable of implementing high-performance computer systems, by using a hybrid nerve synapse effectively forming a neural network.

In accordance with an aspect of the present invention, there is provided a multiplier producing a first current and a second current and then outputting an output current by subtracting a second current from said first current, said multiplier comprising: a first current mirror including a plurality of MOS transistors to form said first current; and a second current mirror including a plurality of MOS transistors to form said second current, wherein said second current mirror is coupled in parallel to said first current mirror.

In accordance with another aspect of the present invention, there is provided a neural network synapse comprising: a first current mirror including a plurality of MOS transistors to form said first current; a second current mirror including a plurality of MOS transistors to form said second current, wherein said second current mirror is coupled in parallel to said first current mirror, wherein said neural network synapse produces am output current, by subtracting a second current from said first current; and a switching means outputting an output current from a first current in response to a control signal.

BRIEF DESCRIPTION OF THE DRAWINGS

The novel features believed characteristic of the invention, as well as other features and advantages thereof, will best be understood by reference to the following detailed description of a particular embodiment, read in conjunction with the accompanying drawings wherein.

DETAILED DESCRIPTION OF PREFERRED EMBODIMENTS

Preferred embodiments of the present invention will be explained below with reference to the accompanying drawings.

Figure 1A:
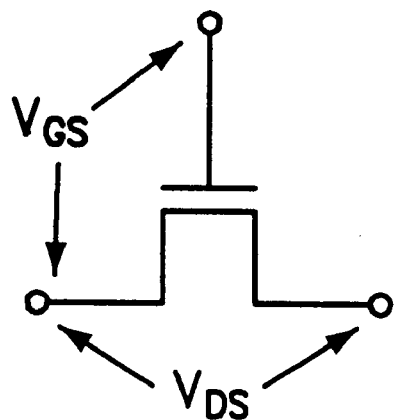
FIG. 1A is a view illustrating a Symbol of a MOSFET.
Figure 1B:
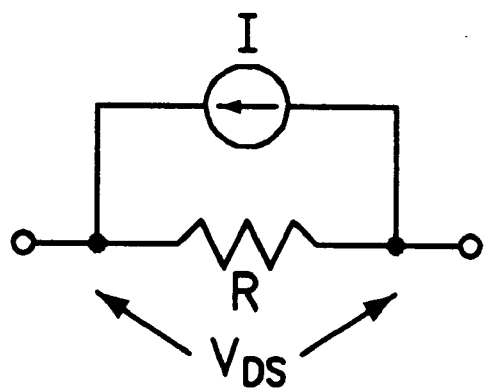
FIG. 1B is an equivalent circuit diagram of the MOSFET in a nonsaturation region (triode region)

A symbol of a MOSFET is shown in FIG. 1A and its equivalent circuit diagram in a nonsaturation region is shown in FIG. 1B. The current-voltage characteristics in the nonsaturation region are given by $$I=(½L)(C_{OX}*W*\mu)*(-V_{DS2}) \quad (1)$$

$$I/R=(C_{OX}*W)*(V_{GS}-V_T) \quad (2)$$

where $\mu$ is known as the mobility of the majority carrier, $C_{OX}$ the gate capacitance, L the length of the channel, W the width of the channel (along an axis normal to L), $V_{DS}$ the voltage between the drain and the source, $V_{GS}$ the voltage between the gate and the source and $V_T$ the threshold voltage of the MOSFET.

Figure 2:
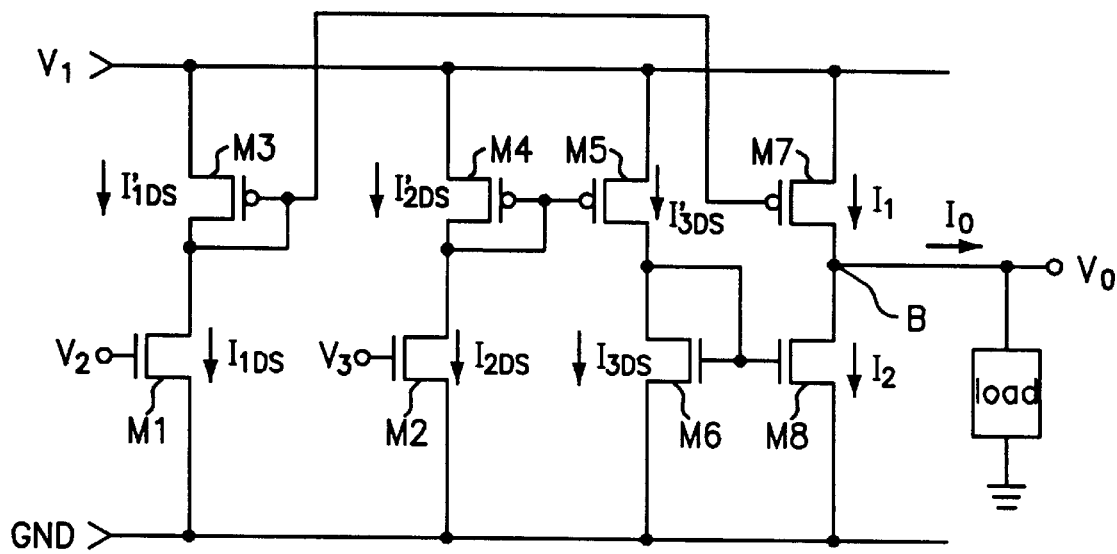
FIG. 2 is a block diagram illustrating a multiplier according to an embodiment of the present invention.

Referring now to FIG. 2, the multiplier according to the present invention includes three current mirrors between a first power supply $V_1$ and a ground voltage level GND. A current mirror includes a p-channel MOSFET M3, an n-channel MOSFET M1 and a p-channel MOSFET M7. A second current mirror includes a p-channel MOSFET M4, an n-channel MOSFET M2 and a p-channel MOSFET M5. A third current mirror includes an n-channel MOSFET M6 and an n-channel MOSFET M8.

The p-channel MOSFET M7 in the first current mirror is coupled to the n-channel MOSFET M8 in the third current mirror and the p-channel MOSFET M5 in the second current mirror is coupled to the n-channel MOSFET M6 in the third current mirror. An output current $I_0$, which flows into a load, is determined by the difference between the current $I_1$ at the p-channel MOSFET M7 and the current $I_2$ at the n-channel MOSFET M8. That is, $I_0=I_1-I_2$.

According to equation (1), the current $I_{IDS}$ at the n-channel MOSFET M1 can be rewritten as $$I_{DS}=\alpha* I(V_2-V_T)*V_1-V_1/2] \quad (3)$$

where $\alpha$ is $(C_{OX}*W*\mu)/L$

Likewise, the current $I_{2DS}$ at the a-channel MOSFET M2 can be rewritten as $$I_{2DS}=\alpha[(V_3-V_T)*V_1-V_{12}/2] \quad (4)$$

A current $I'_{1DS}$ at the p-channel MOSFET M3 is equal to the current $I_{1DS}$ at the n-channel MOSFET M1. Also, because the p-channel MOSFETs M3 and M7 construct the first current mirror, the current $I_1$ at the p-channel MOSFET M7 is equal to the current $I_{1DS}$ at the p-channel MOSFET M3. As a result, the current $I_{1DS}$ is equal to the current $I_1$ by means of the first current mirror.

Further, a current $I_{2DS}$ at the p-channel MOSFET M4 is equal to the current $I_{2DS}$ at the n-channel MOSFET M2. Also, because the p-channel MOSFETs M4 and M5 construct the second current mirror, the current $I_{3DS}$, at the P-channel MOSFET M5 is equal to the current $I_{2DS}$ at the p-channel MOSFET M4. Since the n-channel MOSFET M6 is coupled in series to the p-channel MOSFET MS, a current $I_{3DS}$ is equal to the current $I'_{3DS}$.

On the other hand, because the n-channel MOSFET M6 forms the third current mirror together with the n-channel MOSFET M8, the current $I_2$ is equal to the current $I_{3DS}$.

In other words, $$I_{1DS}=I'_{1DS}=I_1 \text{(by the first current mirror)} \quad (5)$$

$$I_{2DS}=I'_{2DS}=I'_{3DS}=I_{3DS}=I_2 \text{(by the second and third current mirrors)} \quad (6)$$

The output current $I_0$ is given by $$\begin{aligned}
I_0 &= I_1 - I_2 = I_{1DS} - I_{2DS} \quad (7)\\
&= \alpha * [(V_2 V_T) * V_1 - V_1^2/2] - \\
&\quad \alpha * [(V_3 - V_T) * V_1 - V_1^2/2]\\
&= \alpha * (V_2 - V_3) * V_1\\
&= (\alpha * V_1) * V_2 - \beta \, (\beta \text{ is an offset term})
\end{aligned}$$

Consequently, an input voltage $V_2$ applied to the gate of the n-channel MOSFET M1 determines the current $I_1$ and an input voltage $V_3$ applied to the gate of the n-channel MOSFET M2 determines the current $I_2$. In the case where the voltage $V_1$ and the voltage $V_3$ are fixed to a constant voltage level, the output current $I_0$ linearly varies with the external voltage $V_2$. It should be noted that the output current $I_0$ doesn't have a square term of the threshold Voltage $V_T$ and the second and third current mirrors act as one current mirror determining the current $I_2$. However, the output of the second current mirror is out of phase from that of the first current mirror so that the non-linear component of the output current $I_0$ is eliminated. Therefore, the circuit configuration shown in FIG. 2 can be used as a multiplier.

Another embodiment of the present invention will be described below referring to FIG. 3.

Figure 3:
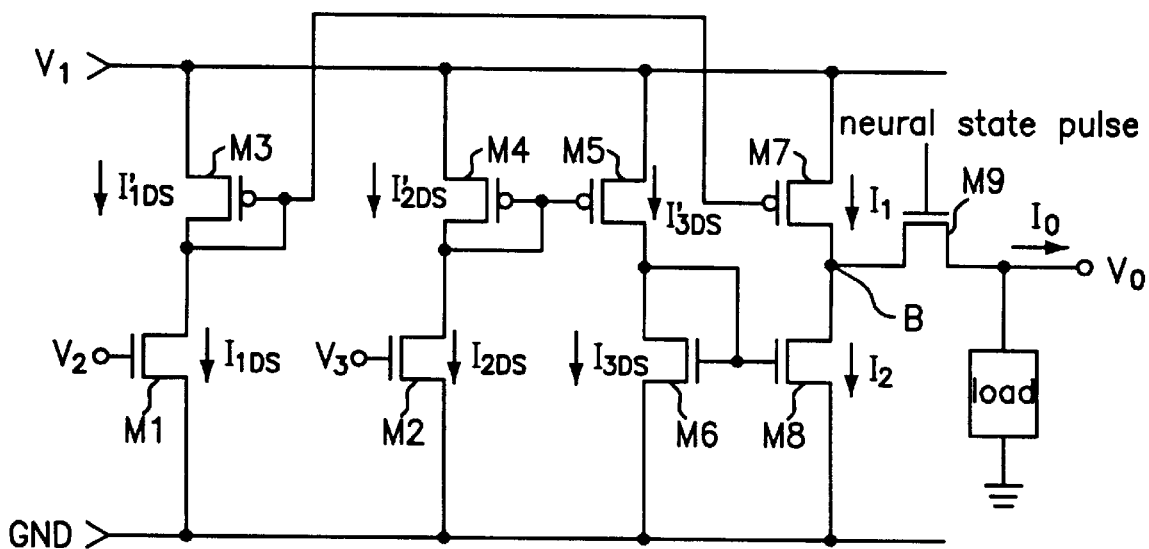
FIG. 3 is a block diagram illustrating a neural network synapse according to another embodiment of the present invention.

As shown in FIG. 3, another embodiment of the present invention further includes an n-channel MOSFET M9 formed at the output terminal of the multiplier. That is, the voltage $V_1$ and the voltage $V_3$ are fixed to a constant voltage level and the voltage $V_2$, which acts as a synapse weight of a neural network, is applied to the gate of the n-channel MOSFET M1. The n-channel MOSFET M9 transfers the output current $I_0$ to the load in response to a neural state pulse. Accordingly, the present invention may provide a basic structure of the synapse of neural network, by accumulating the neural state through a feedback capacitor.

As apparent from the above, the present invention provides a highly integrated multiplier and an improved neural network synapse, by using the low source voltage and the deep-submicron VLSI technology. Also, the present invention has effects on the simplification and integration of the multipliers and the neural network synapses, by using the MOS transistors only in two stages.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A multiplier producing a first current and a second current and then outputting a linear output current by subtracting said second current from said first current, said multiplier comprising:

first input means having a first MOS transistor which generates said first current in response to a first input voltage, wherein said first MOS transistor operates in a nonsaturation region thereof;

a first current mirror including a plurality of MOS transistors to output said first current, being coupled to said first MOS transistor;

a second current mirror including a plurality of MOS transistors to output a second current which is out of phase with said first current;

second input means having a second MOS transistor which generates said second current in response to a second input voltage, wherein said second MOS transistor operates in a nonsaturation region thereof; and a third current mirror including a plurality of MOS transistors to output said second current, being coupled to said second MOS transistor wherein said third current mirror is coupled to said second current mirror.

2. The multiplier in accordance with claim 1, wherein said first current mirror comprises:

a third MOS transistor having a drain and a gate, each of which is connected to a drain of said first MOS transistor, and a source connected to a power supply; and a fourth MOS transistor having a gate connected to said gate of said third MOS transistor, a source connected to said power supply, and a drain connected to said second current mirror.

3. The multiplier in accordance with claim 2, wherein said third current mirror comprises:

a fifth MOS transistor having a drain and a gate, each of which is connected to a drain of said second MOS transistor, and a source connected to said power supply; and a sixth MOS translator having a gate connected to said gate of said fifth MOS transistor, a source connected to said power supply, and a drain connected to said second current mirror.

4. The multiplier in accordance with claim 3, wherein said second current mirror comprises:

a seventh MOS transistor having a drain and a gate, each of which is connected to said third current mirror, and a source connected to a ground voltage level; and an eighth MOS transistor having a gate connected to said gate of said seventh MOS transistor, a drain connected to said first current mirror and a source connected said ground voltage level.

5. The multiplier in accordance with claim 2, wherein said first input voltage is a variable voltage and said second input voltage is a fixed voltage.

6. The multiplier in accordance with claim 2, wherein said first input voltage is a fixed voltage and said second input voltage is a variable voltage.

7. A neural network synapse producing a first current and a second current and then outputting a linear output current by subtracting said second current from said first current, said multiplier comprising:

first input means having a first MOS transistor which generates said first current in response to a first input voltage, wherein the first MOS transistor operates in a nonsaturation region thereof;

a first current mirror including a plurality of MOS transistors to output said first current, being coupled to said first MOS transistor;

a second current mirror including a plurality of MOS transistors to output a second current which is out of phase with said first current;

second input means having a second MOS transistor which generates said second current in response to a second input voltage, wherein said second MOS transistor operates in a nonsaturation region thereof;

a third current mirror including a plurality of MOS transistors to output said second current, being coupled to said second MOS transistor, wherein said third current mirror is coupled to said second current mirror; and switching means for outputting said linear output current from said first current in response to a control signal.

8. The neural network synapse in accordance with claim 7, wherein said control signal is a neural state pulse.

9. The neural network synapse in accordance with claim 7, wherein said first current mirror comprises:

a third MOS transistor having a drain and a gate, each of which is connected to a drain of said first MOS transistor, and a source connected to a power supply; and a fourth MOS transistor having a gate connected to said gate of said third MOS transistor, a source connected to said power supply, and a drain connected to said second current mirror.

10. The neural network synapse in accordance with claim 9, wherein said third current mirror comprises:

a fifth MOS transistor having a drain and a gate, each of which is connected to a drain of said second MOS transistor, and a source connected to said power supply; and a sixth MOS transistor having a gate connected to said gate of said fifth MOS transistor, a source connected to said power supply, and a drain connected to said second current mirror.

11. The neural network synapse in accordance with claim 10, wherein said third current mirror comprises:

a seventh MOS transistor having a drain and a gate, each of which is connected to said third current mirror, and a source connected to a ground voltage level; and an eighth MOS transistor having a gate connected to said gate of said seventh MOS transistor, a drain connected to said first current mirror and a source connected said ground voltage level.

12. The neural network synapse in accordance with claim 10, wherein said first input voltage is a variable voltage and said second input voltage is a fixed voltage.

13. The neural network synapse in accordance with claim 10, wherein said first input voltage is a fixed voltage and said second input voltage is a variable voltage.

14. The neural network synapse in accordance with claim 12, wherein said first input voltage is a weight signal.

15. The neural network synapse in accordance with claim 13, wherein said second input voltage is a weight signal.

* * * * *